United States Patent [19]

Ostrup et al.

[11] Patent Number: 4,864,807
[45] Date of Patent: Sep. 12, 1989

[54] HARVESTING ARRANGEMENT

[75] Inventors: Heinrich Ostrup; Lambert Sanders, both of Harswinkel, Fed. Rep. of Germany

[73] Assignee: Claas Ohg, Harsewinkel, Fed. Rep. of Germany

[21] Appl. No.: 227,762

[22] Filed: Aug. 3, 1988

Related U.S. Application Data

[63] Continuation of Ser. No. 26,522, Mar. 16, 1987, abandoned.

[30] Foreign Application Priority Data

Mar. 26, 1986 [DE] Fed. Rep. of Germany ....... 3610141

[51] Int. Cl.[4] ...................... A01D 45/02; A01D 49/00
[52] U.S. Cl. ........................................... 56/60; 56/500
[58] Field of Search ................ 56/500, 501, 502, 503, 56/504, 505, 99, 100, 101, 102, 98, 14.6

[56] References Cited

U.S. PATENT DOCUMENTS

| 875,749 | 1/1908 | Tilson | 56/102 |
|---|---|---|---|
| 1,028,799 | 6/1912 | Tilson | 56/102 |
| 4,539,799 | 9/1985 | Kalverkamp | 56/500 |
| 4,553,379 | 11/1985 | Kalverkamp | 56/98 |
| 4,631,910 | 12/1986 | Doyen et al. | 56/505 |

FOREIGN PATENT DOCUMENTS

| 44966 | 2/1982 | European Pat. Off. | 56/502 |
|---|---|---|---|
| 2735717 | 2/1978 | Fed. Rep. of Germany | 56/503 |
| 2909412 | 10/1979 | Fed. Rep. of Germany | 56/500 |
| 2096444 | 10/1982 | United Kingdom | 56/500 |

Primary Examiner—Paul J. Hirsch
Attorney, Agent, or Firm—Michael J. Striker

[57] ABSTRACT

A harvesting arrangement for harvesting corn and other grain fruits and formed as a front implement of a harvester thresher, the harvesting arrangement comprises drawing devices for drawing harvested product from the field, a picking gap for separating ears from stalks, a picking roller which is only one for each stalk row, the picking roller including a substantially cylindrical base body with a casing provided with a plurality of impact plates having cut outs, a cutting device including a plurality of individual cutters each having a free-running end which faces toward the base body and an opposite end which faces away from the base body, the casing of the base body having a plurality of recesses in which the free running ends of the cutters are introduced, and holding elements arranged to support the opposite ends of the cutters adjustably relative to the base body.

9 Claims, 3 Drawing Sheets

HARVESTING ARRANGEMENT

This is a continuation of application Ser. No. 026,522, filed Mar. 16, 1987, now abandoned.

BACKGROUND OF THE INVENTION

The present invention relates to a harvesting arrangement for harvesting corn and other grain fruits, and in particular formed as a front implement for a harvester thresher.

Harvesting arrangements of the above mentioned general type are known in the art. A known harvesting arrangement has a drawing device and a picking gap for separating the corn ears from the corn stalks. The harvesting arrangement is provided with one picking roller for each stalk row. The picking roller is associated with partial casing and includes a substantially cylindrical base body with a plurality of impact plates uniformly distributed over its periphery. The impact plates are provided with cut outs for passage of cutting means which are fixedly connected with the harvesting arrangement.

Such a harvesting arrangement is disclosed, for example, in the European patent application No. 0091635. In this arrangement, in addition to picking of the corn ears, the stalks are simultaneously chopped. Since, however, the freely running ends of the stationary cutter blades end shortly before the outer surface of the base body, the stalk parts are not completely separated and the stalk product connected with remaining fiber parts is thrown onto the field. During subsequent soil processing these assembled stalk portions lead to considerable disturbances in the operation of the agricultural devices. In addition, the above mentioned patent application also discloses the cutting means which is fixed in their position relative to the adjustable partial casing. Therefore, the cutter blades can change their function-dependent position in the event of eventual required position change of the partial casing to improve the chopping quality. In quiet operational conditions, such insignificant movement of the partial casing is transmitted to the cutting means. Furthermore, the individual cutting blades are screwed non-changeable in their position relative to the partial casing, so that after wear, especially of the cutting blade tips, the insertion depth of the cutters cannot be adjusted independently from the partial casing.

SUMMARY OF THE INVENTION

Accordingly, it is an object of the present invention to provide a harvesting arrangement for corn and other grain fruits, which avoids the disadvantages of the prior art.

More particularly, it is an object of the present invention to provide a harvesting arrangement of the above mentioned general type which always insures an unobjectionable cutting.

In keeping with these objects and with others which will become hereinafter, one feature of the present invention resides, briefly stated, in that in the individual cutters of the cutting means, their free-running ends which face toward the base body of the picking roller engage into the recesses formed on the base body, while their ends which are opposite to the base body are supported so they are adjustable independently from the partial casing.

When the harvesting arrangement is designed in accordance with the present invention, it eliminates the disadvantages of the prior art and achieves the object of efficient cutting of the harvested product.

The opposite ends of the individual cutters which face away from the base body of the picking roller can be adjustably mounted on a cutter support which extends parallel to the picking roller.

In accordance with another advantageous embodiment of the present invention, the base body of the picking roller is formed as a relatively thin-walled cylindrical pipe in which the above mentioned recesses are formed as circular grooves.

Still a further advantageous feature of the present invention is that the base body of the picking roller is formed of a solid material.

For simplifying the construction, the base body in accordance with still a further embodiment of the invention can be formed as a pipe provided with a plurality of beads which extend parallel to one another and form the above mentioned recesses which are shaped here as circular grooves.

In this embodiment the beads can be provided on the inner surface of the pipe and/or on the outer surface of the pipe, so that the circular grooves can be formed in the inner beads and/or in the outer beads.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF PREFERRED EMBODIMENTS

Figure 1:
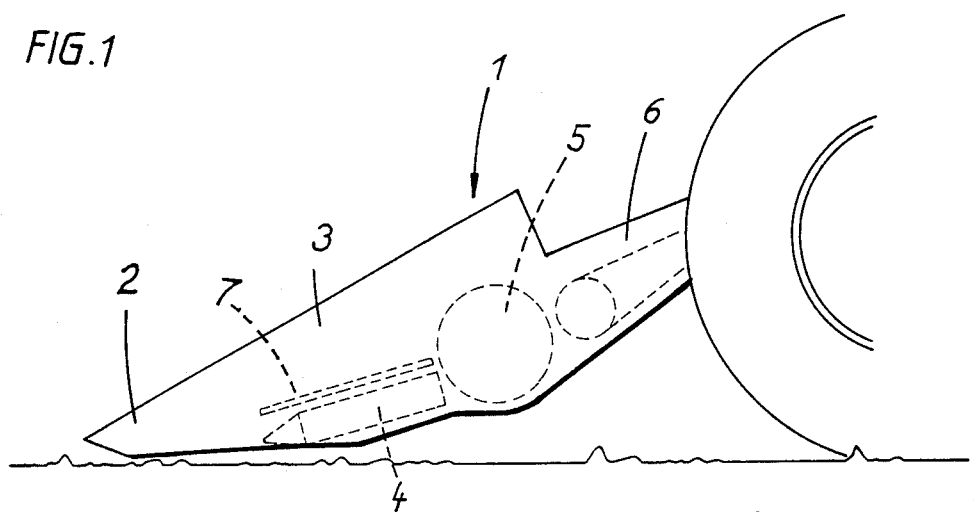
FIG. 1 is a side view of a corn harvesting arrangement.

A corn harvester is identified as a whole with reference numeral 1. It includes two dividers 2 for harvested row. Both dividers 2 are connected with a guiding sheet 3 and associated with a drawing roller 4. During the operation the corn ears removed from stalks are transported to a transverse conveyor screw 5 and from there, via an inclined conveyor 6, into a collecting container or a threshing device.

Figure 3:
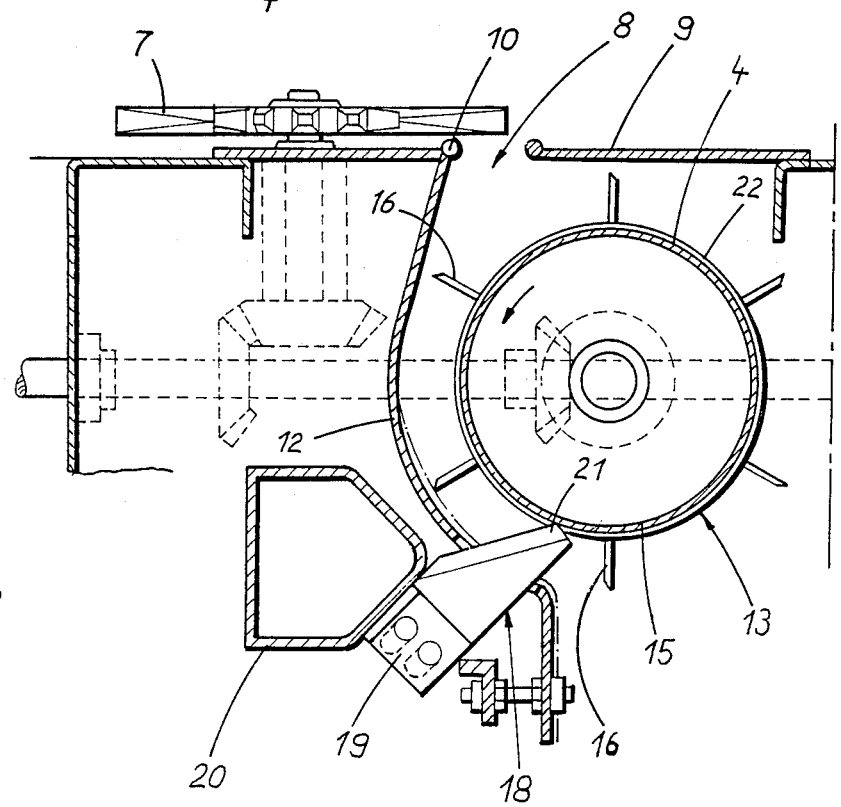
FIG. 3 is a view showing a cross section taken along the line II—II in FIG. 2.
Figure 2:
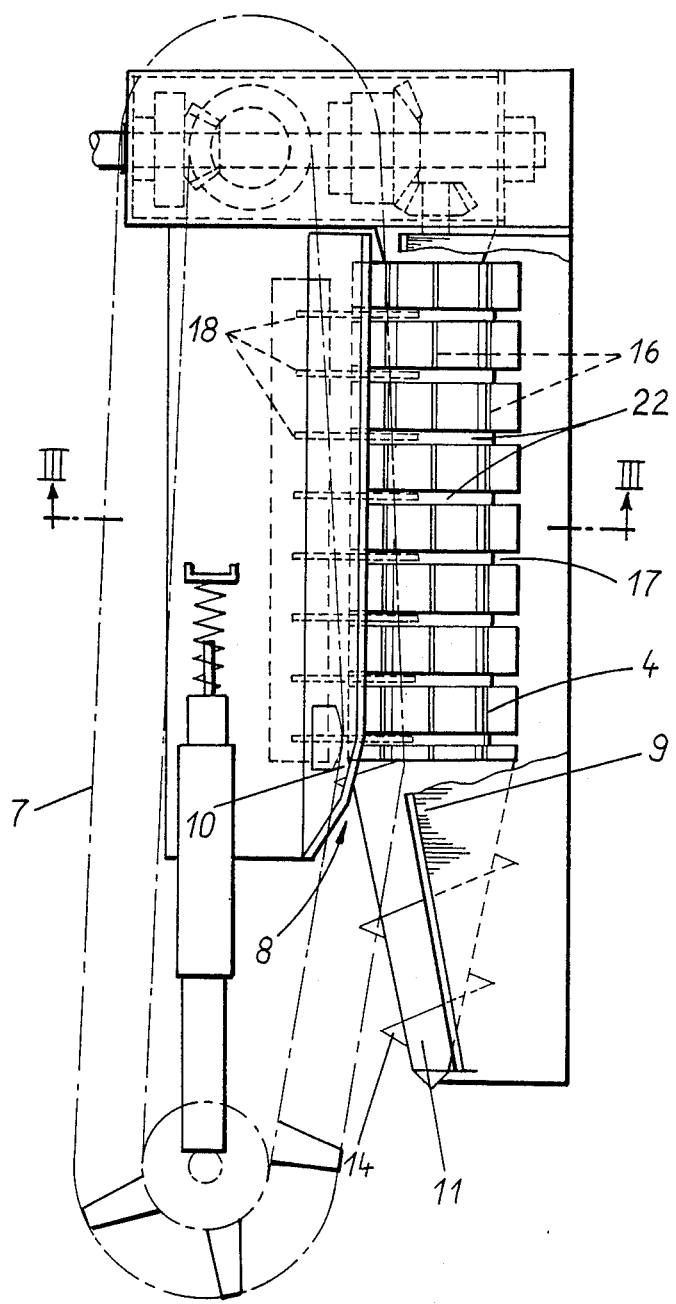
FIG. 2 is a plan view of a part of the corn harvesting arrangement of FIG. 1.

FIGS. 2 and 3 show the support of a drawing chain 7, by means of which the standing stalks are drawn into a picking gap 8, and the separated corn ears are supplied to the transverse conveying screw 5. The picking gap is limited at its one side by an adjustable guiding sheet 9 and its another side by an iron rod 10 which operates as a breaking edge. The drawing roller 4 is drivingly arranged on the guiding sheet 9 and surrounded by a partial casing 12. The partial casing 12 extends downwardly from the iron rod 10. It can be formed of one piece with the iron rod 10 or articulately connected with the latter.

The drawing roller 4 includes a cylindrical base body 13 with a drawing tip 11 which has the shape of a truncated cone and is provided with screw convolutions 14. The base body 13 has a casing 15 which is provided with impact plates 16. The impact plates 16 have cut outs 17.

A cutting blade 18 extends in the cut outs 17 of the impact plates 16. The cutting blade 18 has a cutter holder 19 and a plurality of individual cutters mounted thereon. The cutter holder 19 is screwed with a traverse 20.

Figure 4:
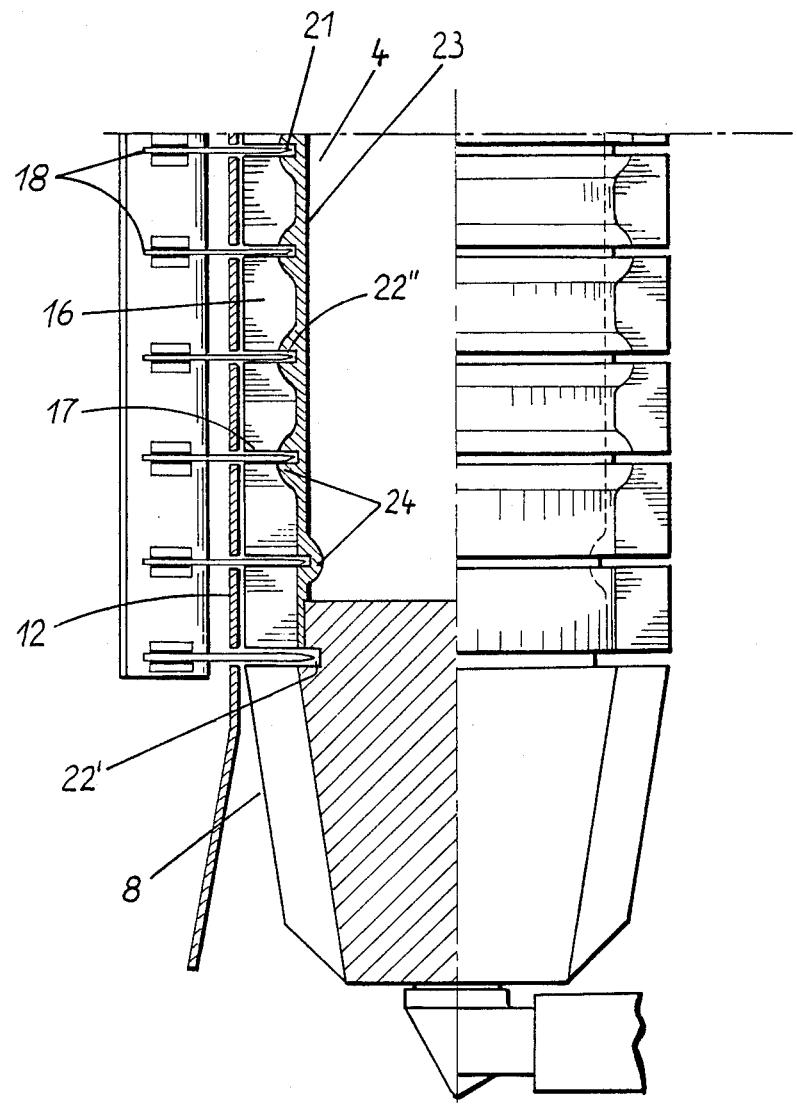
FIG. 4 is a view showing a drawing roller of the harvesting arrangement in three different variations.

For providing absolutely complete separation of the stalks by the cooperation of the drawing roller and the cutting blade, the casing of the base body 13 has circular grooves 22, and free-running cutting blades 21 extend into these grooves. As can be seen from FIG. 4, the base body for this purpose is composed of a solid or complete material in which grooves 22' are formed.

In accordance with a different embodiment, the base body can be formed as a pipe 23 which is provided with beads 24 extending inwardly or outwardly. The beads 24 can be screwed on the pipe 23 or formed of one piece with the pipe. The advantage of this embodiment is that the pipe itself can be made with a thin wall, while the grooves 22' or 22" can be made by turning in the beads 24.

It will be understood that each of the elements described above, or two or more together, may also find a useful application in other types of constructions differing from the types described above.

While the invention has been illustrated and described as embodied in a harvesting arrangement for harvesting corn or similar grain fruits, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of the invention.

What is claimed as new and desired to be protected by Letters Patent is set forth in the appended claims:

1. A harvesting arrangement for harvesting corn and other grain fruits and formed as a front implement of a harvester thresher, the harvesting arrangement comprising drawing means for drawing harvested product from a field; means forming a picking gap for separating ears from stalks; a picking roller provided for each stalk row, said picking roller including a substantially cylindrical base body with a casing provided with a plurality of impact plates having cut outs; a partial casing partially surrounding said picking roller; cutting means including a plurality of individual cutters arranged horizontally adjacent to one another and each having a free-running end which faces toward said base body and an opposite end which faces away from said base body, said casing of said base body having a plurality of recesses in which said free running ends of said cutters are introduced; and holding means arranged to rigidly and immovably support said opposite ends of said cutters and at the same time so that each of said cutters is adjustable relative to said base body independently of said partial casing and in direction towards said body.

2. A harvesting arrangement as defined in claim 1, wherein said body has an axis, said recesses in which said free-running ends of said cutters are introduced are formed as circular recesses extending around said axis.

3. A harvesting arrangement as defined in claim 2, wherein said picking roller has an axis of rotation, said holding means including a traverse extending parallel to said axis of rotation of said picking roller, said opposite ends of said cutters being supported adjustably on said traverse.

4. A harvesting arrangement as defined in claim 1, wherein said base body of said picking roller is formed as a relatively thin-walled cylindrical pipe, said recess being formed as circular grooves in said cylindrical pipe.

5. A harvesting arrangement for harvesting corn and other grain fruits and formed as a front implement of a harvester thresher, the harvesting arrangement comprising drawing means for drawing harvested product from a field; means forming a picking gap for separating ears from stalks; a picking roller provided for each stalk row, said picking roller including a substantially cylindrical base body with a casing provided with a plurality of impact plates having cut outs; a partial casing partially surrounding said picking roller; cutting means including a plurality of individual cutters arranged horizontally adjacent to one another and each having a free-running end which faces toward said base body and an opposite end which faces away from said base body said casing of said base body having a plurality of recesses in which said free running ends of said cutters are introduced; and holding means arranged to rigidly and immovably support said opposite ends of said cutters and at the same time so that each of said cutters is adjustable relative to said base body independently of said partial casing and in direction towards said body, said base body of said picking roller being formed as a pipe provided with a plurality of circular beads extending parallel to one another, said recesses being formed as circular grooves provided in said circular beads.

6. A harvesting arrangement as defined in claim 5, wherein said pipe which forms said base body has an inner surface, said beads being provided on said inner surface of said pipe.

7. A harvesting arrangement as defined in claim 5, wherein said pipe which forms said base body has an outer surface, said beads being provided on said outer surface of said pipe.

8. A harvesting arrangement as defined in claim 5, wherein said pipe which forms said base body has inner and outer surfaces, said beads being provided on said inner and outer surfaces of said pipe.

9. A harvesting arrangement for harvesting corn and other grain fruits and formed as a front implement of a harvester thresher, the harvesting arrangement comprising drawing means for drawing harvested product from a field; means forming a picking gap for separating ears from stalks; a rotatable picking roller provided for each stalk row, said picking roller including a substantially cylindrical base body with a casing provided with a plurality of impact plates having cut outs; a partial casing partially surrounding said picking roller; cutting means including a plurality of individual cutters arranged horizontally adjacent to one another and each having a free-running end which faces toward said base body and an opposite end which faces away from said base body, said casing of said base body having a plurality of recesses in which said free running ends of said cutters are introduced; and holding means arranged to rigidly and immovably support said opposite ends of said cutters and at the same time so that each of said cutters is adjustable relative to said base body independently of said partial casing and in direction towards said base body of said picking roller being formed as a relatively thin-walled cylindrical pipe having an axis, said recesses in which said free-running ends of said cutters are introduced being formed as circular grooves in said cylindrical pipe, said holding means including a traverse extending parallel to said axis of said body of said picking roller, said opposite ends of said cutters being supported adjustably on said traverse.

* * * * *